United States Patent [19]

Prevorsek et al.

[11] Patent Number: 5,104,599
[45] Date of Patent: Apr. 14, 1992

[54] METHOD OF FORMING SHORT FIBERS COMPOSED OF ANISOTROPIC POLYMERS

[75] Inventors: Dusan C. Prevorsek, Morristown; Kwok W. Lem, Randolph; Hong B. Chin, Parisppany, all of N.J.

[73] Assignee: Allied-Signal Inc., Morristownship, N.J.

[21] Appl. No.: 321,945

[22] Filed: Mar. 10, 1989

Related U.S. Application Data

[62] Division of Ser. No. 22,302, Mar. 5, 1987, Pat. No. 4,980,232.

[51] Int. Cl.$^5$ .......................... B29B 9/00; B29B 11/00
[52] U.S. Cl. ...................................... 264/140; 264/138; 264/349
[58] Field of Search ................ 264/140, 143, 138, 349

[56] References Cited

U.S. PATENT DOCUMENTS

| | | | |
|---|---|---|---|
| 2,948,927 | 8/1960 | Rasmussen | 264/140 |
| 2,954,587 | 10/1960 | Rasmussen | 264/140 |
| 4,278,623 | 7/1981 | Niegisoh | 264/140 |
| 4,395,307 | 7/1983 | Kastelic et al. | 264/143 |
| 4,472,241 | 9/1984 | Provost | 264/140 |
| 4,511,623 | 4/1985 | Yoon et al. | 264/140 |
| 4,529,481 | 7/1985 | Yoshida et al. | 264/143 |
| 4,569,811 | 2/1986 | Geier | 264/143 |

*Primary Examiner*—Hubert C. Lorin
*Attorney, Agent, or Firm*—Darryl L. Webster; Richard C. Stewart, II; Gerhard H. Fuchs

[57] ABSTRACT

A process for forming mixtures of short fibers of varying lengths, diameters and aspect ratios composed of an anisotropic polymer.

31 Claims, 3 Drawing Sheets

METHOD OF FORMING SHORT FIBERS COMPOSED OF ANISOTROPIC POLYMERS

This application is a division of application Ser. No. 022,302, filed Mar. 5, 1987, now U.S. Pat. No. 4,980,232.

BACKGROUND OF THE INVENTION

1. Field of the Invention

One aspect of the present invention relates to short fibers of anisotropic polymers, and to processes for forming such fibers. Another aspect of this invention relates to composites comprising a thermoplastic and/or thermoset polymer and short fibers of anisotropic polymers.

2. Prior Art

The use of short fibers as reinforcing components in various types of composites is known. For example, such composites are described in L. J. Broutman and R. H. Krock, "Modern Composite Materials", Addison-Wesley, Boston, Mass. (1967). Such fibers may be composed of inorganic materials or may be composed of organic materials such as polymers. Representative of inorganic materials which may be used in the fabrication of fibers for use in known composites are asbestos, glass, boron, graphitic carbon, amorphous carbon, aluminum, aluminum silicate, aluminum oxide, titanium, magnesium, steel, rockwool, and tungsten. Illustrative of polymeric fibers which can be used in known composites are those composed of rayon, nylon, kevlar, polyesters and polyolefins.

Several methods are described in the prior art for forming polymer fibers. Illustrative of such methods are melt spinning, wet spinning, and dry spinning. Other less common processes are reaction spinning, dispersion spinning, and emulsion spinning. Representative of publications which describe these methods are: H. F. Mark, S. M. Atlas, and E. Cernia, "Man-Made Fibers," Volume 1–3 (1967) and J. E. McIntyre, "Man-Made Fibers, Manufacturer," in Encyclopedia of Polymer Science and Technology, Volume 8, p. 374, by H. F. Mark and N. M. Bikales. One important common feature in these prior art spinning processes is the use of a spinneret which is a plate containing orifices through which the molten or dissolved polymer is extruded and shaped under pressure. Several techniques are described in the prior art for fabrication of polymer short fibers. For example, U.S. Pat. No. 2,988,782 describes such a procedure in which such fibers are formed by precipitation and violent agitation. U.S. Pat. Nos. 4,125,584 and 4,178,336 describe another procedure in which such short fibers are formed by centrifugal spinning. All the short fiber manufacturing processes described above have one important feature in common. In each of these processes, the fiber-forming material must be converted to liquid or solution, either by melting or dissolution, so that it can be transferred by a pump or extruder to a spinneret for fiber spinning.

Polymers capable of forming anisotropic melts are known. By "a polymer capable of forming an anisotropic melt" is meant that the polymer forms such a melt when heated to a particular temperature range, characteristic of the polymer (this type is termed a "thermotropic" polymer), or can be induced to form such a melt by the application of shear to the melt. The latter state is characterized by the persistence of the anisotropic condition for a period of a second or two after the melt ceases to be sheared. This distinguishes it from the well-known observation that a polyethylene terephthalate melt will exhibit order when sheared by passing the melt through a tube. Such order disappears immediately once the melt ceases to be sheared. Some polymers may show both thermotropic and shear-induced anisotropy.

Illustrative of polymers capable of forming anisotropic melts are wholly aromatic polyesters as for example the aromatic polyesters described in Belgian Patent Nos. 828,935 and 828,936; Dutch Patent No. 7505551; West German Patent Nos. 2,520,819, 2,520,820 and 2,722,120; Japanese Patent Nos. 43-223, 2132-116, 3017-692 and 3021-293; U.S. Pat. Nos. 4,118,372, 3,991,013, 3,991,014, 4,057,597, 4,284,757, 4,107,143, 4,066,620, 4,075,262, 3,991,013, 4,140,846, 4,156,070, 4,159,365; 4,169,933; 4,181,792, 4,067,852, 4,083,829, 4,130,545, 4,161,470, 4,284,757, 4,184,996, 4,238,559, 4,238,598, 4,230,817, and 4,256,629; and UK Application No. 2,002,404.

Still other polyesters which exhibit melt anisotropy are those described in Polyester X7G-A Self Reinforced Thermoplastic, by W. J. Jackson, Jr., H. F. Kuhfuss, and T. F. Gray, Jr. 30th Anniversary Technical Conference, 1975 Reinforced Plastics Composites Institute, The Society of the Plastics Industry, Inc., Section 17-D, Pages 1–4; Belgian Pat. Nos. 838,935 and 828,936; Dutch Pat. No. 7505551; West German Pat. Nos. 2520819, 2520820, 2722120, 2834535, 2834536 and 2834537; Japanese Pat. Nos. 43-223, 2132-116, 3017-692 and 3021-293; U.S. Pat. Nos. 4,093,595, 4,130,702, 4,146,702, 4,153,779, 4,181,792, 4,183,895, 4,188,476, 4,201,856, 4,219,461, 4,224,433, 4,226,970, 4,232,143, 4,232,144, 4,238,598, 4,238,600, 4,242,496, 4,245,082, 4,245,084, 4,247,514, 4,265,802, 4,267,304, 4,269,965, 4,272,625, 4,279,803, 4,285,852, 4,287,332, 4,294,955, 4,299,756, 4,314,073, 4,318,841, and 4,318,842, and U.K. application No. 2,002,404.

Representative disclosures of anisotropic melt forming polyesters or poly(ester-amides) which may include 2,6-dicarboxynaphthalene moiety and/or 2,6-dioxynaphthalene moiety are present in U.S. Pat. Nos. 4,067,852; 4,083,829; 4,093,595; 4,118,372; 4,130,545; 4,156,070, 4,169,933; 4,181,792; 4,184,966; 4,188,476; 4,201,856; 4,242,496; 4,247,514; 4,294,955; 4,339,375, and 4,355,134.

Illustrative of polyazomethines which are capable of forming anisotropic melts are disclosed in U.S. Pat. No. 4,048,148.

Blends of melt processable polymers and polymers which form anisotropic melts are known. For example, U.S. Pat. No. 4,565,850 describes a blend of a thermoplastic polymer and an oligomer which exhibits thermotropic behavior at certain temperatures. Similarly, U.S. Pat. No. 4,386,174 describes a composition containing a melt processable polymer and a sufficient quantity of a polymer capable of forming an anisotropic melt at a temperature within the processing temperature range of the melt processable polymer. U.S. Pat. No. 4,611,025 discloses a process for forming a blend of a thermoplastic polymer and a thermotropic oligomer.

U.K. Published Patent Application 2,008,598 discloses a polymer composition comprising 20 percent or less, based on the total weight of polymeric material, of a first rigid polymeric material with the balance being a second polymeric material composed substantially of flexible molecular chains. The first polymeric material is dispersed in the second polymeric material in a microscopic region of 1 $\mu$m. or less. Foreign counterparts of this application include Japanese 54065747, French 2407956 and West German (BRD) 2847783.

U.S. Pat. No. 4,460,735 and its foreign counterpart EPO Patent Application No. 0 044 175 describes polymer blends comprising approximately 75 percent by weight, based upon the total weight of the blend, of a polycarbonate and approximately 25 to approximately 95 percent by weight, based upon the total weight of the blend of a melt processable wholly aromatic polyester which is capable of forming an anisotropic melt phase apart from the blend.

Short fibers are frequently used as a reinforcing component of various types of composites. Representative of these reinforcing fibers include asbestos fibers, glass fibers, boron fibers, graphitic carbon fibers, amorphous carbon fibers, synthetic polymeric fibers, aluminum fibers, aluminum silicate fibers, oxides of aluminum fibers, titanium fibers, magnesium fibers, rockwool fibers, steel fibers, tungsten fibers, cotton fibers, wool fibers, wood cellulose fibers and the like.

SUMMARY OF THE INVENTION

One aspect of this invention relates to mixtures of short fibers derived from anisotropic polymers, said mixture comprising short fibers having average lengths in the range of from about 0.05 cm and about 5 cm, wherein the length distribution of said fibers in said mixture is from about $X\pm 0.1X$ to about $X\pm X$ wherein X is the average length of said fibers in said mixture, said fibers having average diameters in the range of from about 0.0005 cm to about 0.05 cm wherein the diameter distribution of said fibers in said mixture is equal to or less than about $Y\pm Y$ wherein Y is the average diameter of the fibers, and said fibers having an average aspect ratio equal to or greater than about 3. Another aspect of this invention relates to a process for the manufacture of the mixture of said fibers. Yet another aspect of this invention relates to thermoplastic and thermoset composites comprising the mixture of fibers of this invention dispersed in a continuous phase comprised of one or more polymers selected from the group consisting of thermoset and thermoplastic resins.

Several advantages result from the mixture of this invention especially when used as reinforcement and the like in polymer blends. For example, one advantage is that the mixture of this invention results in a more uniform and homogeneous distribution of the short fibers in the blend as compared to the distribution of mixtures of fibers of more uniform length distribution. Moreover, the fibrous mixture of this invention provides blends having decreased melt or solution viscosities which result in improved processability of the blended product. Furthermore, the mixture of this invention provides a blended product having better particle packing.

DETAILED DESCRIPTION OF THE INVENTION

Figure 1:
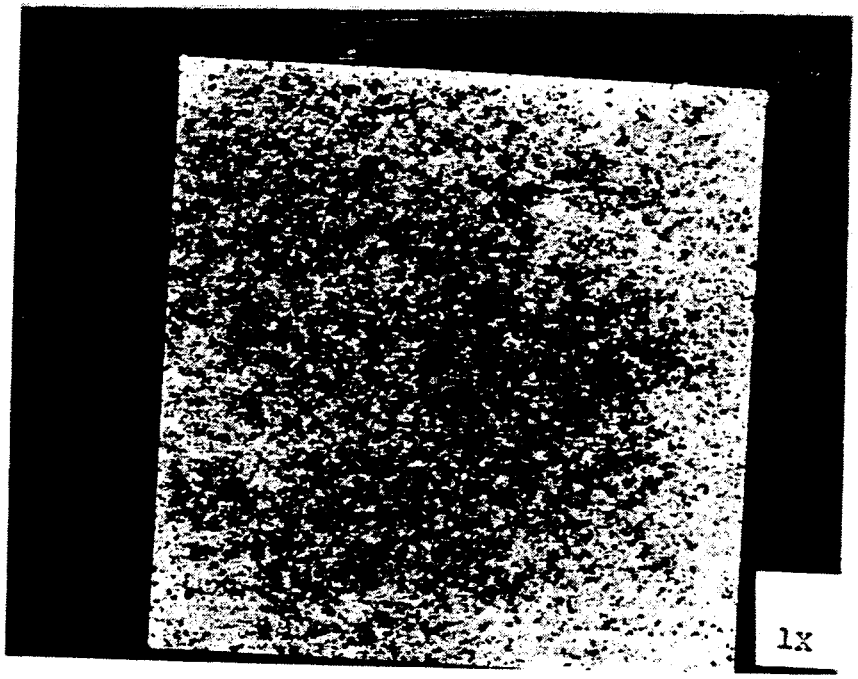
FIG. 1 is a photomicrograph of a cross section of the molded article of Example 4.

One aspect of the present invention relates to a mixture of short fibers composed of a polymer which demonstrates anisotropy in the solid state. The term "short fibers" as used herein refers to fibrous or acicular fibers having a length equal to or greater than about 0.1 cm, a diameter equal to or less than about 0.1 cm, and an "aspect ratio" of greater than about 3, said fibers having a distribution of lengths, aspect ratios and diameters. As used herein, the term "aspect ratio" is the ratio of the length of the fiber to its diameter. In general, the mixture of this invention will comprise fibers having a distribution of lengths, diameters and aspect ratios within the stated ranges. There are no upper limits on the aspect ratio and the length of the short fibers, and there is no lower limit on the diameter of the short fibers. In the preferred embodiments of the invention, the mixture comprises fibers wherein the average length of the fibers is from about 0.05 to about 5 cm, wherein the length distribution of fibers may vary from about $X\pm 0.1X$ to about $X\pm X$, where X is the average length of fibers in the mixture, the aspect ratio of the fibers is at least about 5, and the average diameter of the fibers is from about 0.0005 to about 0.05 cm where the diameter distribution of fibers in the mixture is equal to or less than about $Y\pm Y$ wherein Y is the average diameter of fibers in the mixture. In the particularly preferred embodiments of the invention, the average length of the fibers is from about 0.05 cm to about 1.5 cm, the aspect ratio of the fibers is from about 3 to about 3000, and the average diameter of the fibers is from about 0.0005 cm to about 0.025 cm, said fibers having the length distribution and diameter distribution as set forth hereinabove for the preferred embodiments of the invention. Amongst these particularly preferred embodiments, most preferred are those embodiments of the invention in which the average length of the fibers is from about 0.05 cm to about 1.25 cm, the aspect ratio of the fibers is from about 5 to about 2500, and the average diameter of the fibers is from about 0.0005 to about 0.01 cm, said fibers having the length distribution and diameter distribution as set forth hereinabove for the preferred embodiments of the invention.

The length and diameter distribution of fibers in the mixture may vary widely as indicated above. The preferred length distribution of fibers in the mixture individually may vary from about $X\pm 0.2X$ to about $X\pm X$ and the preferred diameter distribution of fibers in the mixture may vary from about $Y\pm 0.2Y$ to about $Y\pm Y$. The particularly preferred length distribution of the fibers may vary from about $X\pm 0.3X$ to about $X\pm X$, and the particularly preferred diameter distribution of the fibers may vary from about $Y\pm 0.3Y$ to about $Y\pm Y$. Most preferred length distribution varies from about $X\pm 0.4X$ to about $X\pm X$, and most preferred diameter distribution varies from about $Y\pm 0.4Y$ and $Y\pm Y$, with those embodiments in which the length distribution varies from about $X\pm 0.5X$ to about $X\pm X$ and in which the diameter distribution varies from about $Y\pm 0.5Y$ to about $Y\pm Y$ providing the very best results.

The short fibers of this invention are those which are formed from polymers which are anisotropic in the solid state ("anisotropic polymer"). Such anisotropic polymers can be naturally anisotropic due to the molecular structure, i.e., rod type, structure, and include polymers which can be induced to form such an anisotropic solid state by the application of a shear to the polymer in the melt.

Any type of polymer which is anisotropic in the solid state can be used in the practice of this invention. Preferred anisotropic polymers are those which are anisotropic because of their molecular structure. Particularly preferred anisotropic polymers are those which are thermotropic, i.e., anisotropic polymers which form an anisotropic melt when heated to a particular temperature range which is characteristic of the polymer. These particularly preferred thermotropic polymers when in the molten state exhibit shear or elongation flow tendency to orient in the shear or elongation flow direction. Such oriented melts exhibit after solidification a relatively greater structural and mechanical anisotropy as compared to isotropic polymers. Frequently, such anisotropy is considered harmful because the solidified polymer contains strong and weak areas, and process parts formed from such polymers are non-uniform in mechanical properties. However, we have discovered that inherent anisotropy can be used advantageously by allowing fracture of the polymer at the weak boundaries, to produce short fibers of sufficient aspect ratios and mechanical strength for use as reinforcing short fibers.

The anisotropy of polymers in the molten or solid state can be determined by modification of known procedures, such procedures include x-ray diffraction, birefringence, dielectric methods, sonic methods, swelling, nuclear magnetic resonance and infrared dichroism. For example, the procedures described at Col 4, lines 61 to 68; Col 5, lines 1 to 68; and Col 6, lines 1 to 16 of U.S. Pat. No. 4,386,174 and at Col 8, lines 25 to 68, and Col 9 of U.S. Pat. No. 4,118,372 are useful for determining the optical anisotropy of polymers. It is well known that translucent optically anisotropic materials cause light to be transmitted in optical systems equipped with crossed polarizers [see e.g., S. A. Jabarin and R. S. Stein, J. Phys. Chem., 77,399 (1973)], whereas transmission of light is theoretically zero for isotropic materials. Thus, optical anisotropy can be determined by placing a sample of the polymer on a heating state of a polarizing microscope and bringing the temperature up to and beyond the polymer flow temperature. If the polymer is optically anisotropic in the melt, a bright field will be observed at temperatures above the polymer flow temperature. This may be confirmed through use of the thermo-optical test (TOT) described below. The apparatus is similar to that described by I. Kirshenbaum, R. B. Isascson, and W. C. Feist, Polymer Letters, 2, 897-901 (1964).

In general, anisotropic polymers for use in the practice of this invention are substantially linear rod shaped polymers containing a relatively high degree of aromaticity in the polymeric backbone. Illustrative of useful polymers are wholly aromatic polyesters, as for example the polyesters described in Belgian Pat. Nos. 828,935 and 828,936; Dutch Pat. 7505551; West German Patent Nos., 2,520,818; 2,520,819; 2,834,535; 2,834,536; 2,834,537; 2,520,820 and 2,722,120; Japanese Patent Nos. 43-223, 2132-116; 3017-692 and 3021-293; U.S. Pat. Nos. 4,118,372; 3,991,013; 3,991,014; 4,057,597; 4,284,757; 4,107,143; 4,066,620; 4,075,262; 4,140,846; 4,156,070; 4,159,365; 4,169,933; 4,181,792; 4,067,852; 4,083,329; 4,130,545; 4,161,470; 4,284,757; 4,184,996; 4,238,559; 4,238,598; 4,230,817; 4,256,624; 4,047,597; 4,093,595; 4,153,779; 4,181,792; 4,219,461; 4,232,144; 4,245,082; 4,267,304; 4,287,332; 4,183,895; 4,224,433; 4,238,598; 4,245,084; 4,269,965; 4,294,955; 4,226,970; 4,238,599; 4,247,514; 4,272,625; 4,299,756; 4,130,545; 4,130,702; 4,083,829; 4,146,702; 4,188,476; 4,238,600; 4,279,803; 4,318,842; 4,314,073; 4,201,856; 4,232,143; 4,242,496; 4,265,802; 4,285,852; and 4,318,841; U.K. application No. 2,002,404.

Representative anisotropic polyesters or poly(esterimides) useful in the practice of this invention which may include 2,6-dicarboxynaphthalene moiety are described in U.S. Pat. Nos. 4,067,852; 4,083,829; 4,093,595; 4,118,372; 4,130,545; 4,156,070; 4,169,933; 4,181,792; 4,184,966; 4,188,476; 4,201,856; 4,242,496; 4,247,514; 4,294,955; 4,339,375 and 4,355,134.

Representative of useful polyazomethines are those described in U.S. Pat. No. 4,048,148; and representative of useful polyesteramides are those described in U.S. Pat. No. 4,272,625.

In the preferred embodiments of this invention, preferred anisotropic polymers are those having recurring moieties derived from reaction of one or more compounds selected from the group consisting of aromatic diols, aromatic diamines, aromatic hydroxy amines, aromatic hydroxy acids and aromatic amino acids with one or more compounds selected from the group consisting of aromatic dicarboxylic acids, aromatic hydroxy acids and aromatic amino acids. In the particularly preferred embodiments of the invention, the anisotropic polymers are those having recurring moieties derived from reacting one or more compounds selected from the group consisting of aromatic diols, aromatic diamines, aromatic hydroxy amines, aromatic hydroxyacids, and aromatic amino acids with one or more aromatic dicarboxylic acids, or those derived by self reaction of aromatic hydroxy acids or aromatic amino acids, or those derived by reaction between two or more acids selected from the group consisting of aromatic hydroxy acids and aromatic amino acids. Preferred aromatic diol, aromatic diamine, and aromatic hydroxy amine compounds include those of the following formulas I to VI:

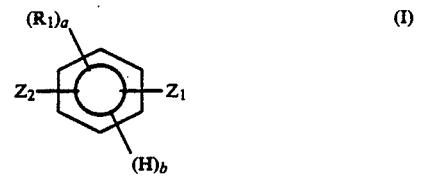

(I)

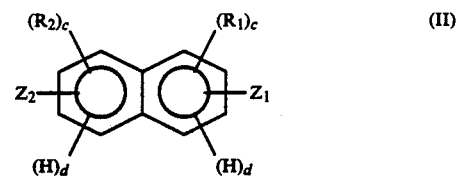

(II)

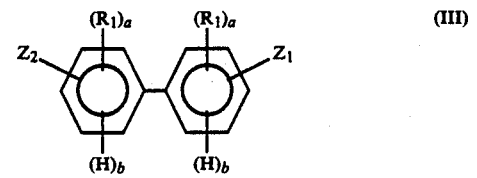

(III)

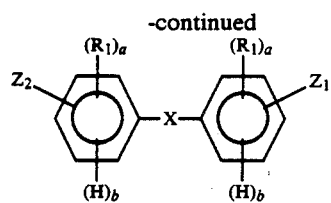 (IV)

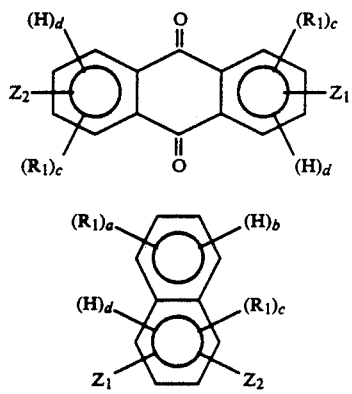 (V)

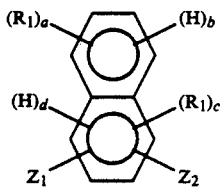 (VI)

wherein:
- $Z_1$ and $Z_2$ are the same or different at each occurrence and an hydroxy, or —$NHR_3$ wherein $R_3$ is hydrogen or alkyl having from 1 to about 6 carbon atoms;
- $R_1$ is the same or different at each occurrence and is an inert substituent other than hydrogen such as halogen, trihalomethyl, alkyl or alkoxy having from 1 to about 6 carbon atoms, phenyl or substituted phenyl wherein permissible substituents are halogen, alkyl, phenyl alkoxy, trihalomethyl, phenyl substituted with any of the foregoing, and like inert substituents;
- —X— is oxygen, methylene, methylene substituted with alkyl having from 1 to about 6 carbon atoms, sulfur, sulfonyl or sulfenyl;
- a and b are the same or different at each occurrence and are whole numbers from 0 to 4 with the proviso that the sum of a and b is not greater than 4; and
- c and d are the same or different at each occurrence and are whole numbers from 0 to 3, with the proviso that the sum of c and d is not greater than 3.

Illustrative of these preferred aromatic diol, aromatic diamine and aromatic hydroxyamine compounds are the following formulas VII to XIV:

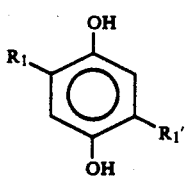 (VII)

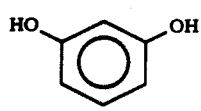 (VIII)

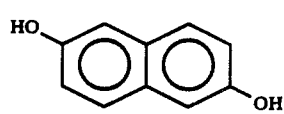 (IX)

 (X)

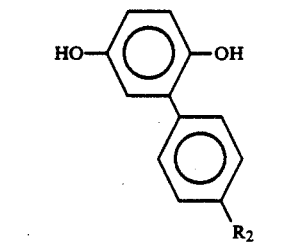 (XI)

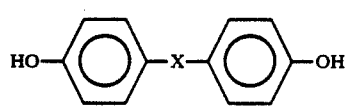 (XII)

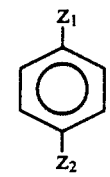 XIII

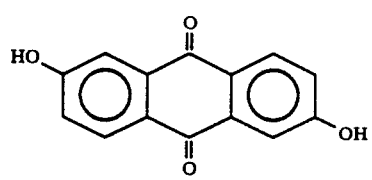 (XIV)

wherein:
- $R_1$, $R_1'$, and $R_2$ are the same or different at each occurrence and are hydrogen, halo such as chloro or bromo, or alkyl or alkoxy having from 1 to about 4 carbon atoms such as methoxy, ethoxy, butoxy, methyl, ethyl, propyl, butyl, isopropoxy, and isobutyl; and
- $Z_1$ and $Z_2$ are the same or different at each occurrence and are —OH, or $NHR_3$ where $R_3$ is hydrogen or alkyl having from 1 to about 6 carbon atoms;
- X is —O—, —$SO_2$—, —S—, —$CH_2$— or —$C(CH_3)_2$— and the open valencies are substituted with hydrogen.

Preferred aromatic dicarboxylic acid compounds used in the preparation of the preferred anisotropic polymers include those of the following formulas XV to XVIII:

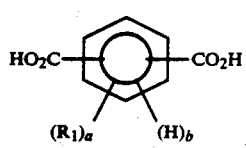 (XV)

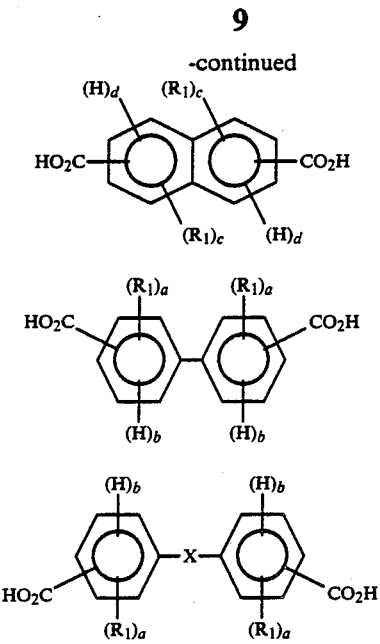

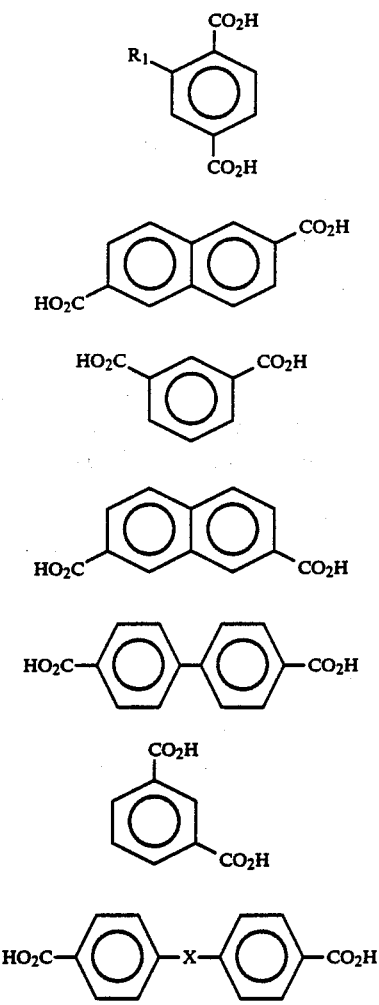

wherein: $R_1$, X, a, b, c and d are as defined below. Illustrative of these preferred aromatic dicarboxylic acids are those of the following formulas XIX to XXV:

wherein $R_1$ is as described above, X is oxygen or $-OCH_2O-$ and the open valencies are substituted with hydrogen.

Preferred aromatic hydroxy acid or amino acid compounds used in the preparation of the preferred anisotropic melt forming polymers include those of the following formula XXVI and XXVII:

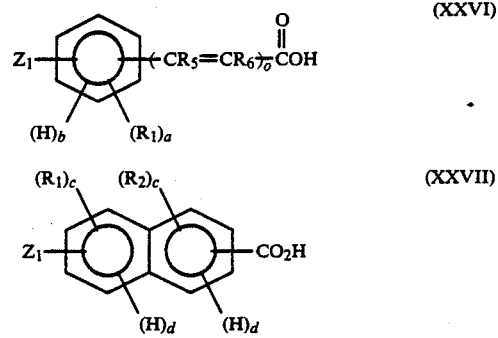

wherein:
$R_1$, $Z_1$, a, b, c and d are as described above;
the number o is 0 or 1, and
$R_5$ and $R_6$ are the same or different and are hydrogen or alkyl having from 1 to about 6 carbon atoms.
Illustrative of these preferred aromatic hydroxy acids or amino acid compounds are those of the following formulas XXVIII to XXXII:

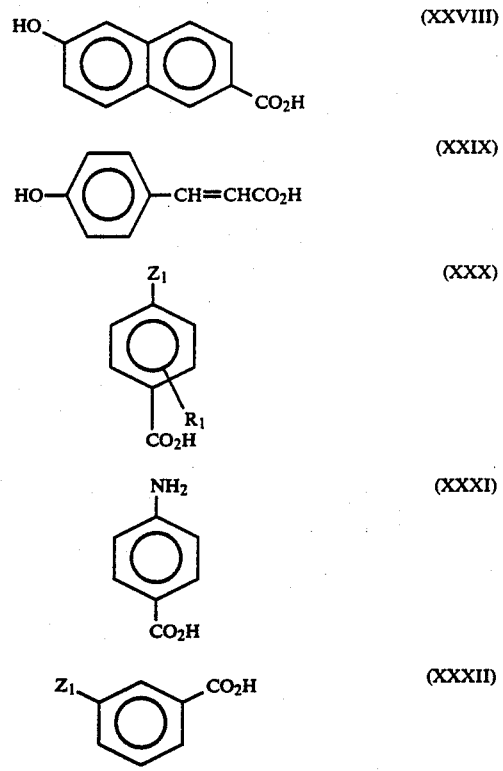

wherein $Z_1$ and $R_1$ are as defined above, and the open valencies are substituted with hydrogen.

In the particularly preferred embodiments of the invention, useful anisotropic polymers are those having recurring moieties derived from reactions of aromatic diols, aromatic dicarboxylic acids and aromatic hydroxy or amino acids; or derived by reaction of aromatic diols and aromatic dicarboxylic acids; or derived by self reaction of aromatic hydroxy or amino acids; or derived by reaction of two or more aromatic hydroxy acids and/or aromatic amino acids of the formulas:

X' is —O— or —OCCH$_2$O—, and the open valencies are substituted with hydrogen.

Amongst these particularly preferred embodiments, most preferred are those embodiments in which the anisotropic polymer is selected from among those having recurring moieties derived from reactions of aromatic diols, aromatic dicarboxylic acids and aromatic hydroxy acids or amino acids of the following formulas as described above for the particularly preferred embodiments of this invention.

| Aromatic diol or diamine moiety | Aromatic dicarboxylic acid moiety | Hydroxy acid or amino acid moiety |
|---|---|---|
| hydroquinone (OH/OH with $R_1$) | terephthalic acid with $R_1$ | benzoic acid with $Z_1$, $R_1$ |
| resorcinol | 2,6-naphthalenedicarboxylic acid | benzoic acid with $Z_1$ |
| 2,6-dihydroxynaphthalene | 2,6-naphthalenedicarboxylic acid | 6-hydroxy-2-naphthoic acid |
| 4,4'-dihydroxybiphenyl | 4,4'-biphenyldicarboxylic acid | 4-aminobenzoic acid |
| HO—Ph—X—Ph—OH | | isophthalic acid (HO$_2$C, CO$_2$H) |
| dihydroxyanthraquinone | | HO$_2$C—Ph—X'—Ph—CO$_2$H |

In the above formulas, R$_1$ is chloro or bromo, Z$_1$ is hydroxy or —NHR$_3$ wherein R$_3$ is hydrogen or alkyl, X is —CH$_2$—, —C(CH$_3$)$_2$—, —O—, —SO$_2$— or —S—,

| Aromatic diol | Aromatic dicarboxylic acid moiety | Hydroxy acid or amino acid moiety |
|---|---|---|
| hydroquinone | terephthalic acid | benzoic acid with $Z_1$ |
| resorcinol | 2,6-naphthalenedicarboxylic acid | benzoic acid with $Z_1$ |

| Aromatic diol | Aromatic dicarboxylic acid moiety | Hydroxy acid or amino acid moiety |
|---|---|---|
| 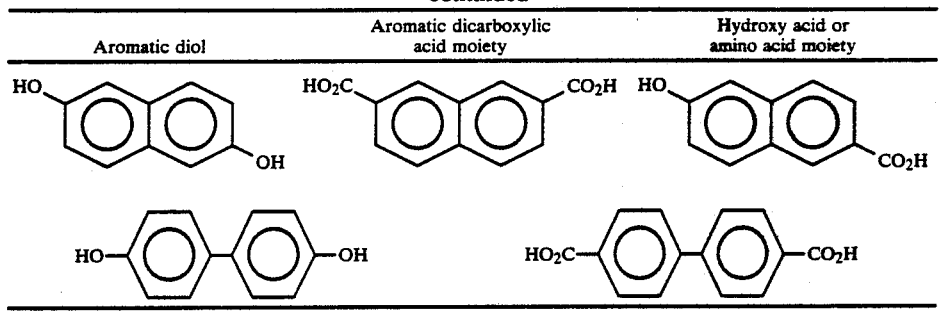 | | | wherein $Z_1$ is hydroxyl and amino, and the open valencies are substituted with hydrogen.

The polymers making up the short fibers are of fiber forming molecular weight. As used herein, "fiber forming molecular weight" is a molecular weight which is sufficient to provide a fiber. In general, the molecular weight of the polymer is at least about 1000. In the preferred embodiments of the invention, the molecular weight of the polymer is from about 1000 to about 1,000,000, and in the particularly preferred embodiments is from about 2000 to about 800,000. Amongst these particularly preferred embodiments most preferred are those embodiments wherein the molecular weight of the polymer is from about 2500 to about 750,000.

Anisotropic polymers useful in the practice of this invention can be obtained from commercial sources or can be prepared in accordance with known techniques. For example, such polymers can be conveniently manufactured by the techniques described in the patents mentioned above.

The short fibers of this invention can be conveniently manufactured by the direct conversion of anisotropic solid polymers into short fibrous structures. Molten anisotropic melt forming polymers exhibit under shear or elongational flow a strong tendency to orient along the axis of the shear or flow. Such oriented melts exhibit after solidification a relatively large amount of structural and mechanical anisotropy. Usually, these solidified polymers contain strong and weak areas. We have now discovered that this inherent anisotropy of solidified anisotropic melt forming polymers can be used advantageously by mechanically breaking the solidified polymers along the weak boundaries to produce short fibers with sufficient lengths, diameters, length distributions, diameter distributions, aspect ratios and mechanical strength for use as fibrous reinforcement for a wide variety of resin compositions.

The mixture of short fibers can be conveniently prepared by fracturing the solid polymer along the boundaries of aligned polymer molecules in the solid polymer. In some instances substantially all the polymer molecules in the solid polymer are aligned in substantially the same direction. However, in some instances the solid polymer will consist of a number of random discrete domains, each domain having polymer molecules aligned in substantially the same direction. The various domains may be either in alignment or disalignment. It is preferred that the solid polymer is fractured by subjecting a portion of the solid anisotropic polymer to stresses which are less than those stresses necessary to cause general failure of all or the portion of solid polymer longitudinally or perpendicular to the alignment of polymer molecules in the portion, and equal to or greater than those stresses necessary to cause general failure of the portion transverse to or parallel to the general alignment of polymer molecules in the portion solid polymer to fracture the solid polymer to form the mixture of this invention.

Stress used in a particular situation may vary. In general, we have discovered that the strength of the polymer is the most critical parameter in determining required stresses, and that the greater the strength of the polymer, the greater the stresses required to provide the desired fracturing, and the lower the strength of the polymer the lower the required stresses. In the preferred embodiments of the invention stresses applied to the polymer are within the range of from about 500 psi (35 kg/cm$^2$) to about 25,000 psi (1758 kg/cm$^2$), and in the particularly preferred embodiments, stresses are from about 3000 psi (211 kg/cm$^2$) to about 15,000 psi (1055 kg/cm$^2$). Amongst these particularly preferred embodiments of the invention, most preferred are those embodiments in which stresses are from about 4,000 psi (281 kg/cm$^2$) to about 8,000 psi (562 kg/cm$^2$), with the best results obtained through use of stresses of from about 5,000 psi (352 kg/cm$^2$) to about 7,000 psi (492 kg/cm$^2$).

The shape and size of the solid polymer used in the formation of the mixture of this invention is not critical, and may vary widely depending on the size and configuration of the device subjecting the solid polymer to the required fracturing stresses. Large chunks, fragments, pellets, particles and the like of all sizes, shapes and configurations can be employed in the conduct of the process of this invention.

Any method which mechanically disintegrates or comminutes large pieces of solidified polymer can be used in the practice of this invention to apply the necessary fracturing stresses. The method of choice is largely dictated by the nature of the solidified polymer and by the size desired. The stresses required for fracturing can be compression or nipping, impact, tumbling, cutting or shredding, and attrition. Moreover, other techniques, such as thermal shock, weathering, ultrasonics, electrical methods, pressure alternation, chemical methods, and explosion can be used. Such methods for use in fracturing solid materials are known in the art with respect to use with other materials and will not be described herein in great detail.

Briefly stated, in one representative embodiment, the solidified polymer can be fractured by low speed impact between two surfaces in a compression or nipping device, such as jaw, gyratory, and roll crushers, disk pan, and roll mills. Impact mills, which operate by subjecting solidified polymers to the required stresses through impact may also be used. For instance, the solidified polymer may be impacted with swinging hammers in hammer mills and may be fractured in vibratory mills by high speed compression between two surfaces. The solidified polymers may also be fractured in tumbling mills by the action of a tumbling mass of loose grinding media which can be steel or ceramic balls or rods, or even large pieces of the solidified polymers being comminuted. The solidified polymers can be fractured in the cutting and shredding devices which operate through the cutting action of a knife blade that can be either moving or stationary, and in attrition devices, the solidified polymers may fractured by a solid or fluid impeller.

In yet another useful procedure, the solidified polymers may be fractured by thermal shock in which fracture is achieved by raising or lowering the temperature of a material causing different thermal expansion and resulting in internal stresses that causes fractures. In this procedure, thermal conditions can be achieved by steam, liquid nitrogen, plasma, fire, and the like. In yet another useful procedure, the solidified polymers may be fractured by electrical methods which fracture is achieved by high frequency electromagnetic waves impinging on materials and by electrical shock using wave amplitudes and frequencies to cause the necessary internal stresses for fracture. In still another procedure, the solidified polymers may be fractured by sudden pressure changes in pressure alternation method; by ultrasonics techniques in which resonant vibrations cause the solidified polymers containing mixed compositions to be excited or to vibrate at different frequencies and thus fracture; and by chemical methods which rely on chemicals (such as strong acids and bases) that are absorbed or that react with the solidified polymers and thus weaken the material bond. These methods of fracturing the solid anisotropic melt forming polymer are merely representative of useful methods, and other methods of forming the short fiber of this invention may be used.

In the preferred embodiments of the invention, the short fibers of this invention can be conveniently manufacturing by grinding in a high intensity grinder preferrably equipped with a sharp blade. The configuration of the short fibers derived from this process depends on the geometrical parameters of the grinder, operation conditions, geometry of the starting material, and most important of all, the type of the starting material. The grinder such as those which may be bought commercially under a trade name of Waring blender, essentially consists of an impeller which rotates at high speed in a cylindrical cavity. The speed of the impeller rotation may vary, depending on the type of thermotropic polymers used, preferrably at a speed ranging from 15,000 to 20,000 rpm. The impeller had a plurality of blades whose narrow dimensions lie substantially in the plane of the impeller's rotation. The number of blades in the impeller may vary; preferable are four blades with equal distance apart. The distance between the tips of the blades and the inner peripheral surface of the cylindrical cavity is at least about 0.01 cm apart, preferably is from about 0.01 to about 10 cm apart; and more preferably is from about 1 to about 2.5 cm. The solidified polymer can be in any configuration, preferably in the form of pellets. There is no upper limit for the dimensions of the starting material; its length is preferably not shorter than 0.1 cm.

In a typical operation, solidified thermotropic polymer pellets are fed into the grinder and short fibers are produced directly through fracture of weak boundaries in the anisotropic solid by mechanical forces. The use of a cooling medium to remove excessive heat generated during grinding in order to maintain a constant temperature is preferred to prevent degradation and change of material property. The cooling medium can be any materials capable of removing heat; preferrable are dry ice and liquid nitrogen. The desired process temperature may vary depending on the type of thermotropic polymer used. Typically, a temperature of about 0° C. is adequate, preferrably lower.

The short fibers of this invention can be used for any purpose for which other short organic or inorganic fibers are used. In the preferred embodiments of the invention, the short fibers of this invention are used to form the composite of this invention which comprises such short fibers dispersed in a continuous polymer phase where the polymer is selected from the group consisting of thermoplastic and thermoset polymers. The use of the fibers of this invention as a reinforcement in such a polymer improves its properties such as heat distortion temperature, strength, stiffness, and impact resistance. The fibers disclosed herein are ideal for use as a reinforcement in a composite because of its exceptional high modulus and melting. Moreover, the fibers of this invention are more uniformly dispersed in the polymer than other conventional short fibrous reinforcement such as asbestos.

The short fibers function is discrete reinforcing fibers in the continuous resin phase. Accordingly, the melting point of the polymer making up the short fibers must be sufficiently high such that the polymer does not melt during the formation of the composite. The melt point of the polymer should be greater than the melt temperature if thermoplastic polymers are employed to form the continuous resin phase, and should be greater than curing temperature where the continuous resin phase is composed of a cured thermoset resin. In general, the melting point of the polymer making up the short fibers is at least about 5° C. greater than the melting of the thermoplastic resin or the curing temperature of the thermoset resin, whichever is applicable. In the preferred embodiments of the invention, the melting point of the short fibers is at least about 10° C. greater than the melting point of the thermoplastic resin, or the curing temperature of the thermoset resin, whichever is applicable, and in the particularly preferred embodiments of the invention, the melting point of the short fibers is at least about 20° C. greater than the melting point of the thermoplastic resins or the curing temperature of the thermoset resin. Amongst these particularly preferred embodiments, most preferred are those embodiments in which the melting point of the short fibers is at least about 30° C. greater than the melting point of the thermoplastic resin and or the curing temperature of the thermoset resin.

The amount of fiber can vary widely depending on the purpose for which it is being used. For example, in those instances when the fiber is being used as reinforcement, the amount of fiber employed is usually at least to about 1 weight percent based on the total weight of the composite, while in those instances where the fiber is used as a dispersion aid, the amount of fiber is usually at least about 0.1 percent on the aforementioned basis. In the preferred embodiments of the invention, the amount of fiber employed is from about 2 to about 99 weight percent based on the total weight of the composite, and in the particularly preferred embodiment is from about 10 to about 90 weight percent on the aforementioned basis. Amongst these particularly preferred embodiments, most preferred are those embodiments in which the amount of short fibers employed is from about 10 to about 85 weight percent based on the total weight of the composite.

The second essential component of the composite of this invention is a thermoplastic or thermoset resin. The type of resin employed is not critical and essentially any thermoplastic or thermoset resin known to those of skill in the art can be used.

Illustrative of suitable thermoset resins are epoxy resins such as diglycidyl ethers of bisphenol A, epoxy phenol novalac resins, and cycloaliphatic epoxy resins; unmodified and modified phenolic resins; substituted phenolic resins such as cresol novolac; polyimide resins; resins formed from modified bisphenol A, as for example resins formed by curing dicyano bisphenol A; urethane resins; allylic resins, such as diallyl phthalate resins; polyester resins; alkyd resins; melamine-formaldehyde resins; and the like.

Illustrative of useful thermoplastic resins are polyketones such as poly(etherether) ketone, polyesters such as polylactones, poly(butylene terephthalate), poly(ethylene terephthalate), poly(ethylene sebacate), poly(decamethylene adipate), poly(decamethylene sebacate), poly(pivalolactone), poly($\alpha,\alpha$-dimethyl propiolactone), poly($\alpha,\alpha$-diethyl $\beta$-propiolactone), poly(para-hydroxybenzoate), poly(($\alpha,\alpha$-bis(chloromethyl) $\beta$-propiolactone)), poly(ethylene oxybenzoate), poly(6-azabicyclo (2,2,2) octane-5-one), poly(ethylene isophthalate), poly(8-azabicyclo (3,2,1) octan-6-one, poly(tetramethylene isophthalate), poly($\alpha,\alpha$-diphenyl $\beta$-propiolactone), poly(tetramethylene terephthalate), poly(hexamethylene terephthalate), poly(decamethylene terephthalate), poly(trans-1,4-cyclohexane dimethylene terephthalate), poly(ethylene-1,5-maphthalate), poly(cis-1,4-cyclohexylidene dimethylene terephthalate), poly(1,4-cyclohexyliden dimethylene terephthalate) and the like; polyamides such as poly(4-aminobutyric acid), poly(6-amino hexanoic acid), poly(7-aminoheptanoic acid), poly(8-aminooctanoic acid), poly(9-aminononanoic acid), poly(10-aminodecanoic acid), poly(11-aminoundecanoic acid), poly(12-aminododecanoic acid), poly(hexamethylene adipamide), poly(heptamethylene pimelamide), poly(octamethylene suberamide), poly(nonamethylene azelamide), poly(decamethylene azelamide), poly(decamethylene sebacamide), poly(m-xylene adipamide), poly(p-xylylene sebacamide), poly(2,2,2-trimethyl hexamethylene terephthalamide), poly(piperazine sebacamide), poly(metaphenylene isophthalamide), poly(p-phenylene terephthalamide) and the like; poly sulfides such as poly(phenylene sulfide), poly(propylene sulfides), and the like; polyetherimides; polycarbonates such as poly[methane bis(4-phenyl)carbonate], poly[1,1-thane bis(4-phenyl)carbonate], poly[2,2-propane bis(4-phenyl)carbonate], poly[1,1(1-phenyl ethane) bis(4-phenyl)carbonate], poly[1,1cyclohexane bis(4-(2,6-dichlorophenyl))carbonate]; polyethers; polysulfones; polyoxides such as poly(methylene oxides), poly(2,6-diphenyl-1,4-phenylene oxide), poly(2,5-dimethyl-1,4-phenylene oxide), poly[2,2-bis(chloromethyl)-trimethylene-3-oxide], polystyrene oxide), poly(3-phenoxy propylene oxide) and the like; polyethersulfones; polymers of $\alpha,\beta$-unsaturated monomers such as polyolefins as for example polyethylene, poly(isobutylene), poly(2-methylstyrene), polypropylene and polystyrene, and other resins such as poly(methacrylic acid), poly(methylmethacrylate), poly(acrylonitrile), poly(vinylchloride), poly(vinylalcohol), poly(methylacrylate), and poly(vinyl methyl ether), and the like.

Preferred resins for use in the practice of this invention are thermoset resins, such as polyester, phenolic, polyimide, epoxy, urethane and allylic resins; and thermoplastic resins such as polyester, polyamide, polyketone, polysulfone, polyethersulfone, polyoxide, polyether and polyolefin resins. Particularly preferred resins are thermoset resins such as phenolic, epoxy, urethane, allylic and polyimide resins; and thermoplastic resins such as polyester, polyamide, polysulfone, polyethersulfone, polyketone, polyether, and polyolefin resins. Amongst these particularly preferred resins, most preferred are thermoset resins such as phenolic, epoxy and polyimide resins; and thermoplastic resins such as polysulfone, polyester, polyethersulfone and polyolefin resins.

Mixtures of thermoplastic and thermoset resins are also preferred for use in the practice of this invention. Illustrative of these preferred mixtures are mixtures of phenolic resins and nylon, and compositions composed of a matrix material formed by crosslinking a material having two or more cyanate functions as for example dicyano bisphenol A having dispersed therein a thermoplastic resin such as polysulfone which compositions are described in more detail in U.S. Pat. No. 4,157,360 incorporated herein by reference.

The composite of this invention may include additional non-essential components for appearance and property improvements. Such other additives include particulate fillers, colorants, antioxidants, stabilizers, and the like. The nature of such additives will vary widely and will depend upon the nature of the fiber and resin contained in the composition, intended uses of the composition, and the like. The amount of such additives may vary widely. In general, if used, the amount of the additives may vary from about 10 to about 81 weight percent based on the total weight of the composition, preferably from about 30 to about 50 weight percent on the aforementioned basis.

The composite of this invention can be formed using conventional techniques for blending reinforcing fibrous fillers into thermoplastic or thermoset resins. For example, the particulate reinforcing fillers can be intimately blended with the thermoplastic or thermoset resin by either dry blending or melt blending, or blending in extruders or other types of mixers. If desired, the reinforcing fillers can be blended with the monomers or precured resin in the polymerization or curing reaction as long as the polymerization or curing reaction is not adversely affected. Ordinarily, however, it is preferred to subject the intimate blend of reinforcing filler and polymer to a second melt blending step in cases where melt blending of filler and polymer is not done initially. This second melt blending step is desirable to permit the incorporation of other necessary additives uniformly into the polymer-filler blend.

The composite of this invention has many uses. The composition can be used in applications where improved distortion temperature, strength, stiffness and impact resistance is required. For example, the composition of this invention is useful in the fabrication of structural composites and the matrices for friction materials.

In another preferred embodiment of this invention, the short fibers can be employed to improve the dispersion of other particulate or fibrous fillers or other materials in a polymer matrix. In this method of using the short fibers of this invention, the fibers together with a filler such as asbestos, or other materials as for example ground-rubber, are blended into a thermoset or thermoplastic resin as described above to provide a more uniform dispersion of the fiber of this invention and the filler and other materials in the thermoplastic or thermoset polymer matrix.

The following examples are presented to more particularly illustrate the invention and are not to be construed as limitation thereto.

EXAMPLE 1

A quart size high speed Waring blender equipped with a sharp blade was charged with 8 grams of thermotropic polymer pellets whose aspect ratio (i.e., length to diameter L/D) was 3.4. The polymer was a copolymer of para-hydroxybenzoic acid and 6-hydroxy-2-naphthalic acid sold commercially under the trade name of LCP 2000 (now under a new trade name, Vectra A900 or B900) by Celanese Specialty Operations. Approximately 80 grams of dry ice was charged to the blender as a cooling medium. The blender was turned on at a blade rotational speed about 20,000 rpm. The temperature of the material was maintained at below 0° C.; and a small amount of dry ice was added from time to time during the course of the operation to maintain such temperature. It was observed, after the material was ground for about two minutes, that the original pellets were broken and had become fibrillated. After 36 minutes of grinding, the operation was stopped, and the fibrillated material was removed from the blender. The short fibers having a very high aspect ratio of 32 were obtained. The average length of the fibers was about 0.51 cm. The average diameter of the fibers was about 0.016 cm and the average aspect ratio was about 32.

A small amount of fine fibers were also produced. These fine fibers were examined in an optical microscope. The average length of the fine fibers was 0.16 cm with a 0.07 standard deviation, the average diameter was 0.004 cm with a 0.002 standard deviation, the average aspect ratio was 40.

EXAMPLE 2

The procedure of Example 1 was followed except that another thermotropic polymer, a copolymer of para-hydroxybenzoic acid with biphenol and terephthalic acid, sold under a trade name of Xydar 300 by Dartco Manufacturing, Inc., was used. The short fibers obtained had an average aspect ratio of about 35; had an average length of 0.5 cm with a 0.17 standard deviation and had an average diameter of 0.017 cm with a 0.002 standard deviation.

EXAMPLE 3

The procedure of Example 1 was followed except the total operation time (i.e., the time of grinding) was varied from 10 to 63 minutes. The aspect ratio and dust content of the short fibers obtained were measured. The dust content was determined by sieving the short fibers using a 60 mesh screen. The portion of the material having a size less than 60 mesh was considered as dust content. The results are shown in the following Table 1.

TABLE 1

| Time (Mins) | Aspect Ratio L/D | Dust Content (wt %) |
|---|---|---|
| 0 | 3.4 | 0 |
| 10 | 19.5 | 6 |
| 28 | 20.7 | 9 |
| 36 | 32.0 | 10 |
| 63 | 38.0 | 11 |

As can be seen from Table 1, both aspect ratio and dust content increased with grinding time. Moreover, the rate of the increase in aspect ratio is faster than that for dust content, indicating that the breakage occurs through certain weak surfaces of the anisotropic material.

The distribution of the fibers made in Example 3 was examined using a microscope after the material was ground for 63 minutes. The average length was found to be 0.493 cm with 0.268 standard deviation, the mean diameter of the fiber was 0.0129 cm with a standard deviation of 0.0059 cm, and the mean aspect ratio was 38 and its standard deviation is 10.

EXAMPLE 4

The fibers made in Example 1 were used to make a composite material with the following composition.

| Ingredient | Parts |
|---|---|
| Fiber | 44 |
| Phenolic Resin[1] (with 10% hexa) | 17 |
| Ground Rubber[2] | 12 |
| Calcium Sulfate | 15 |
| Barium Sulfate | 12 |

[1]"Phenolic Resin" was a phenol/formaldehyde resin.
[2]"Ground Rubber" was styrene-butadiene and polyisoprene polymer mixed with carbon black sold by U.S. Rubber Reclaiming Co., Inc. with the trade name Ground Rubber.

The above ingredients were mixed in a conventional blender, a Patterson Kelly blender, for 6 minutes. The mixture was then molded at 180° C. and at about 3000 psi for 20 minutes using a 3"×3" closed mold. The molded article exhibited very uniform fiber dispersion as shown in FIG. 1.

EXAMPLE 5

The procedure of Example 4 was followed except that equal parts of chrysotile asbestos and the fibers made in Example 1 were used as the filler fiber material. The dispersion of the fibers in the molded article was much more uniform than that of Comparative Example 1.

EXAMPLE 6

Two (2) grams of the fibers made in Example 2 were added to 98 grams glycerine, and the mixture was vigorously agitated using a motor-driven stirrer. The viscosity of the mixture was measured after it has been degassed using a Brookfield viscometer Model HATD 3112. At 24° C. and 0.5 RPM, the viscosity of the mixture was found to be 220 poise. Under the same conditions, the viscosity of glycerine is 10 poise.

EXAMPLE 7

The procedure of Example 6 was followed except 6 grams of the fibers were added to 94 grams of glycerine the viscosity of the mixture was found to be 2499 poise.

EXAMPLE 8

The fibers made in Example 2 were used to make a composite material with the following composition.

| Ingredient | Parts |
| --- | --- |
| Fiber | 22 |
| Phenolic Resin[1] (with 10% Hexa) | 17 |
| Ground Rubber[2] | 12 |
| Calcium Sulfate | 15 |
| Barium Sulfate | 12 |

[1] "Phenolic Resin" was a phenol/formaldehyde resin.
[2] "Ground Rubber" was styrene-butadene and polyisoprene polymer with carbon black sold by U.S. Rubber Reclaiming Co., Inc. with the tradename Ground Rubber.

The above ingredients were mixed in a conventional blender, a Patterson Kelly blender, for 6 minutes. The mixture was then molded at 180° C. and at about 3000 psi (211 kg/cm$^2$) for 20 minutes using a 3"×3" (7.6 cm×7.6 cm) closed mold. The molded article exhibited very uniformed fiber dispersion as seen by the distribution of the ground rubber.

COMPARATIVE EXAMPLE 1

Figure 2:
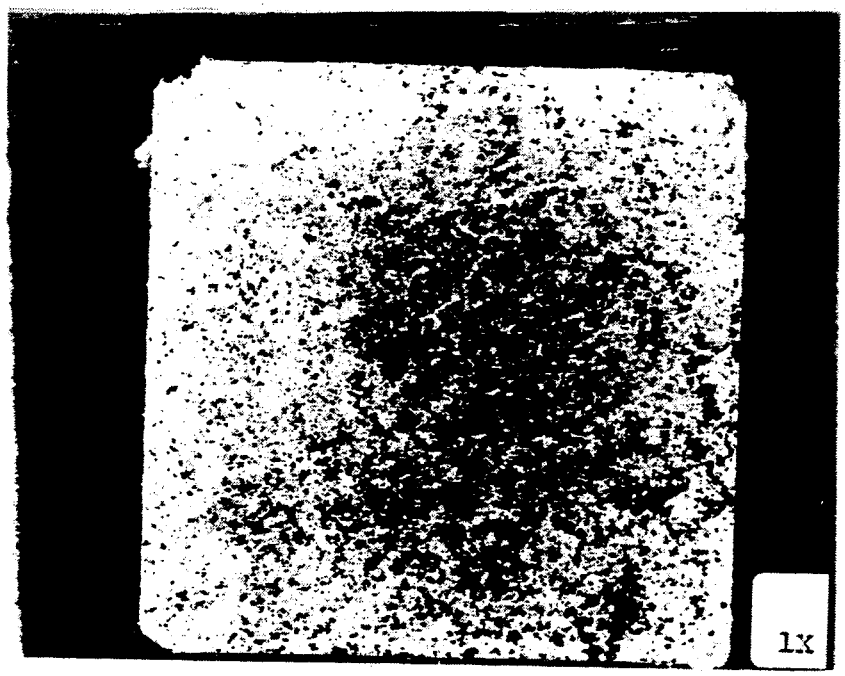
FIG. 2 is a photomicrograph of a cross section of the molded article of Comparative Example 1.

The procedure of Example 4 was followed except that chrysotile asbestos was used to replace the fibers made in Example 1. The dispersion of the asbestos fibers in the molded article was poor as shown by FIG. 2.

COMPARATIVE EXAMPLE 2

This comparative example illustrates that no fibers with high aspect ratio can be made from the solidified isotropic melt polymers using the solid state process described in Example 1. The procedure of Example 1 was followed except that 10 grams of polytetrafluoroethylene, obtained from Dupont under the tradename Teflon ®, was used in place of the thermotropic polymer. The aspect ratio of the starting material was 7.5 (Length=1.5 cm/Diameter=0.2 cm). The material became powder having a low aspect ratio of about 1 (Length=0.02 cm) after 5 minutes grinding.

COMPARATIVE EXAMPLE 3

The procedure of Comparative Example 2 was repeated using a high density polyethylene sold from Allied-Signal, Inc., under the trade name of Paxon ®. The aspect ratio of the starting material was 0.50 (Length=0.2 cm and Diameter=0.4 cm). The material deformed very little after 5 minutes grinding.

COMPARATIVE EXAMPLE 4

The procedure and formulation of Example 8 were repeated except the Kevlar fibers were used to replace the fibers made in Example 2. The fibers were chopped by a sharp knife to have an average length similar to the average length of the fibers made in Example 2. The short fibers had an average aspect ratio of 56; had an average length of 0.51 cm with a 0.019 standard deviation and had an average diameter of 0.0091 cm with a standard deviation of 0.0002. At 2 wt % fiber loading, the viscosity of the mixture was found to be 14506 poise, which is 66 times higher than the mixture containing the fibers made in Example 2, and 5.8 times higher than the mixture containing 6 wt % of the fibers made in Example 2.

COMPARATIVE EXAMPLE 5

Figure 3:
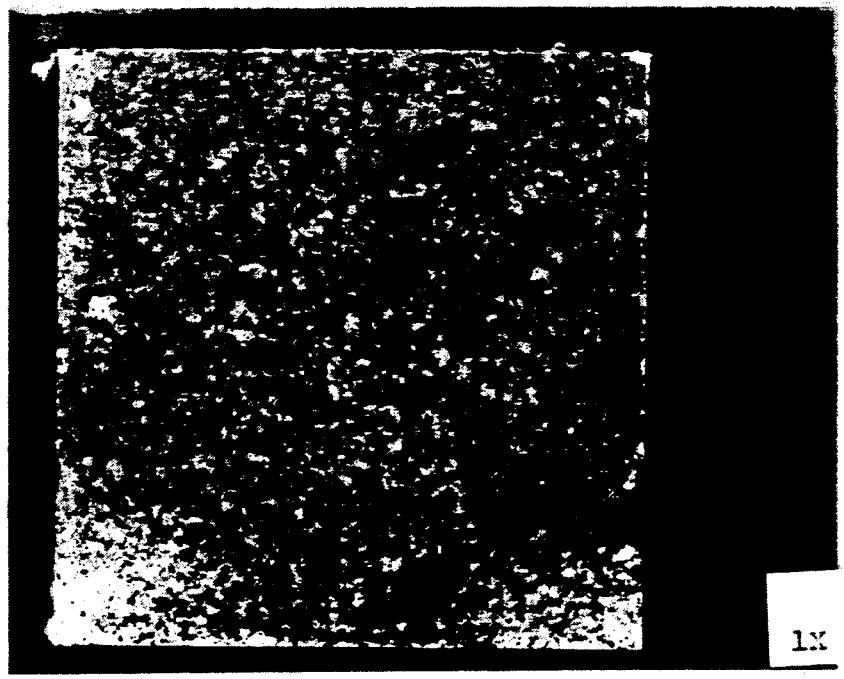
FIG. 3 is a photomicrograph of a cross section of the molded article of Comparative Example 5.

The procedure of Example 8 was followed except that the Kevlar fibers made in Comparative Example 4 was used to replace the fibers made in Example 2. As seen in FIG. 3, the molded article exhibited very poor fiber dispersion during molding as seen by the distribution of ground rubber.

What is claimed is:

1. A process of forming a mixture of randomly oriented short filaments of anisotropic polymer, which filaments have varying lengths and varying diameters, and said filaments in said mixture having an average length equal to or greater than about 0.05 cm wherein the length distribution of said filaments in said mixture is from about $X\pm0.1X$ to about $X\pm X$ wherein X is the average length of said filaments in said mixture, an average aspect ratio equal to or greater than about 3, and an average diameter equal to or less than about 0.1 cm and greater than about 0.0005 cm herein the diameter distribution of said filaments in said mixture is equal to or less than about $Y\pm Y$ wherein Y is the average diameter of said filaments capable of uniform distribution when dispersed in a continuous polymer phase; said process comprising fracturing solid anisotropic polymer substantially along boundaries of aligned polymer molecules in said solid polymer to form said mixture.

2. A process according to claim 1 wherein fracturing comprises subjecting solid anistropic polymer of any shape or size to stress which is less than stress necessary to fracture any portion of said solid polymer substantially transverse to the alignment of polymer molecules in said portion and which is equal to or greater than stress necessary to fracture said portion substantially longitudinally to the alignment of polymer molecules in said portion forming said mixture of said short fibers.

3. A process according to claim 2 wherein said stress is from about 500 psi (35 kg/cm$^2$) to about 25,000 psi (1758 kg/cm$^2$).

4. A process according to claim 3 wherein said stress is from about 3000 psi (211 kg/cm$^2$) to about 15,000 psi (1055 kg/cm$^2$).

5. A process according to claim 4 wherein said stress is from about 4000 psi (281 kg/cm$^2$) to about 8000 psi (562 kg/cm$^2$).

6. A process according to claim 5 wherein said stress is from about 5000 psi (352 kg/cm$^2$) to about 7000 psi (492 kg/cm$^2$).

7. A process according to claim 1 wherein said mixture comprises short fibers having average lengths in the range of from about 0.05 cm and about 5 cm wherein the length distribution of said fibers in said mixture is from about $X\pm0.1X$ to about $X\pm X$ wherein X is the average length of said fibers in said mixture, said fibers having aspect ratios equal to or greater than about 3, and said fibers having average diameters in the range of from about 0.0005 cm to about 0.05 cm wherein the diameter distribution of said fibers in said mixture is equal to or less than about $Y\pm Y$ wherein Y is the average diameter of said fibers.

8. The process of claim 1 wherein the diameter distribution of filaments in said mixture is from about $Y\pm0.5Y$ to about $Y\pm Y$.

9. The process of claim 8 wherein the diameter distribution of filaments in said mixture is from about $Y\pm0.4Y$ to about $Y\pm Y$.

10. The process of claim 9 wherein the diameter distribution of filaments in said mixture is from about $Y\pm0.3Y$ to about $Y\pm Y$.

11. The process of claim 10 wherein the diameter distribution of filaments in said mixture is from about $Y\pm0.2Y$ to about $Y\pm Y$.

12. The process of claim 11 wherein the average diameter of said filaments is from about 0.0005 cm to about 0.05 cm.

13. The process of claim 12 wherein the average diameter of said filaments is from about 0.0005 cm to about 0.025 cm.

14. The process of claim 13 wherein said average diameter of said filaments is from about 0.0005 cm to about 0.01 cm.

15. The process according to claim 1 wherein said polymer is a thermotropic polymer.

16. The process according to claim 15 wherein said polymer is a thermotropic polyamide, polyester or polyesteramide having recurring moieties derived from reaction of one or more compounds selected from the group consisting of aromatic diols, aromatic diamines, aromatic hydroxy amines, aromatic hydroxy acids and aromatic amino acids, with one or more compounds selected from the group consisting of aromatic diols, aromatic hydroxy acids and aromatic amino acids, with one or more compounds selected from the group consisting of aromatic dicarboxylic acids, aromatic hydroxy acids and aromatic amino acids.

17. The process of claim 16 wherein said polymer is derived from reaction of one or more compounds selected from the reaction of one or more compounds selected from the group consisting of aromatic diols, aromatic diamines, aromatic hydroxy amines, aromatic hydroxy acids and aromatic amino acids with one or more aromatic dicarboxylic acids; by self reaction of aromatic hydroxy acids or aromatic amino acids; or by reaction of two or more compounds selected from the group consisting of aromatic hydroxy acids and aromatic amino acids.

18. The process according to claim 17 wherein said aromatic diol, aromatic hydroxy amino or aromatic diamine is of the formulas I to VI:

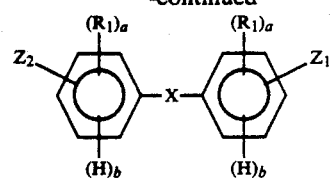
(I)

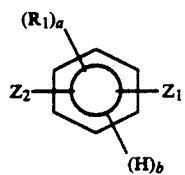
(II)

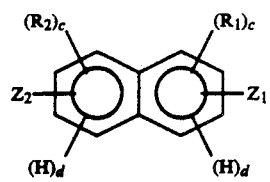
(III)

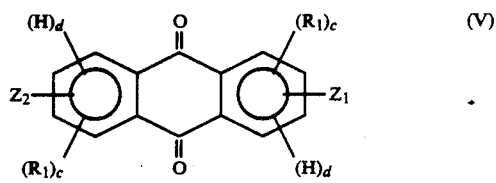
(IV)

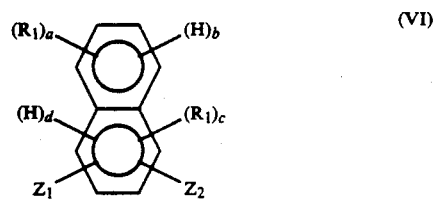
(V)

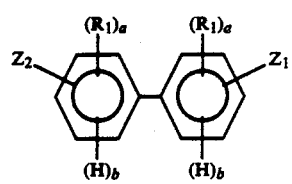
(VI)

said aromatic dicarboxylic acid is of the formulas XV to XVIII;

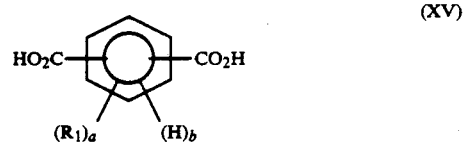
(XV)

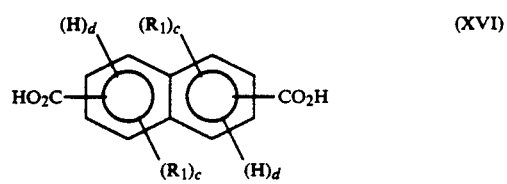
(XVI)

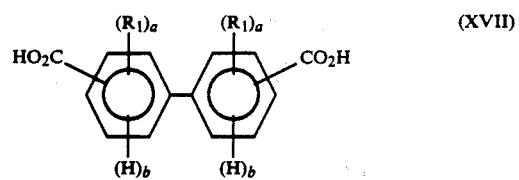
(XVII)

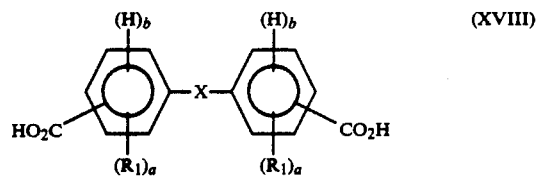
(XVIII)

and said hydroxy aromatic acid or aromatic amino acid is of the formulas XXVI to XXVII:

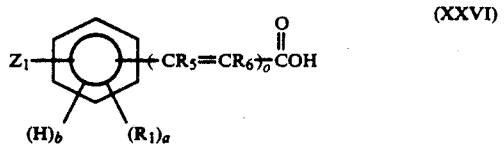
(XXVI)

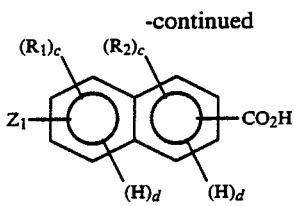 (XXVII)

wherein:
Z$_1$ and Z$_2$ are the same or different at each occurrence and are —OH or —NHR$_3$ wherein R$_3$ is hydrogen or alkyl having from 1 to about 6 carbon atoms;
R$_1$ is the same or different at each occurrence and are inert substituents other than hydrogen;
—X— is methylene, oxygen, methylene substituted with alkyl having from about 1 to about 6 carbon atoms, sulfur, sulfonyl or sulfenyl;
a and b are the same or different at each occurrence and are whole numbers from 0 to 4, with the proviso that the sum of a and b is not greater than 4;
o is 0 or 1;
c and d are the same or the same or different at each occurrence and are whole numbers from 0 to 3, with the proviso that the sum of c and d is not greater than 3;
R$_5$ and R$_6$ are the same or different and are hydrogen or alkyl having from 1 to about 6 carbon atoms.

19. The process according to claim 18 wherein said aromatic diols or aromatic diamine are of the formulas VII to XIV:

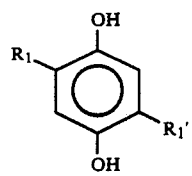 (VII)

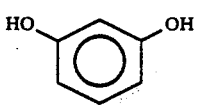 (VIII)

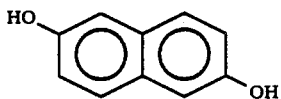 (IX)

 (X)

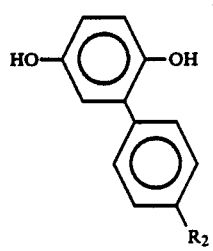 (XI)

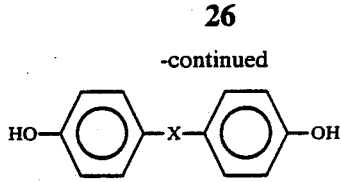 (XII)

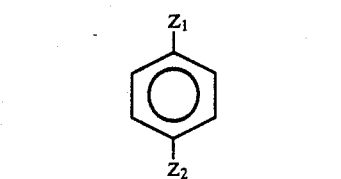 (XIII)

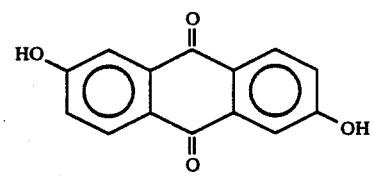 (XIV)

said aromatic dicarboxylic acids are of the formulas XIX to XXV:

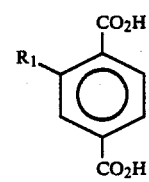 (XIX)

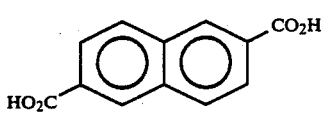 (XX)

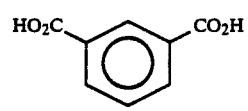 (XXI)

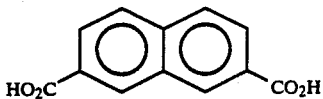 (XXII)

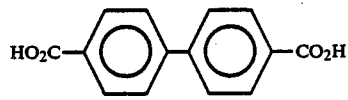 (XXIII)

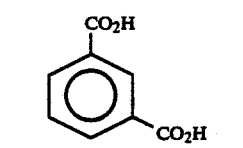 (XXIV)

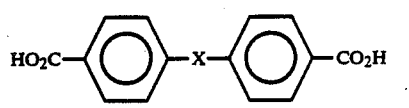 (XXV)

and said aromatic amino or aromatic hydroxy acids are of the formulas XXVIII to XXXII:

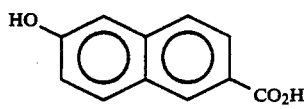 (XXVIII)

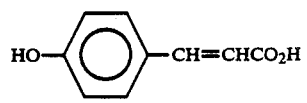 (XXIX)

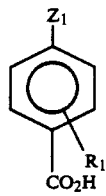 (XXX)

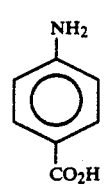 (XXXI)

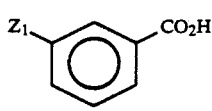 (XXXII)

wherein:
—X— is oxygen, methylene, methylene substituted with one or two alkyl groups, sulfur, sulfenyl or sulfonyl;

$R_1$ and $R_1'$ are the same or different at each occurrence and are hydrogen, halogen, or alkyl or alkoxy having from 1 to about 4 carbon atoms; and $Z_1$ and $Z_2$ are the same or different at each occurrence and are —OH or —$NHR_3$ wherein $R_3$ is hydrogen or alkyl having from 1 to about 6 carbon atoms; wherein the open valencies in said formula are hydrogen substituents.

20. The process according to claim 19 wherein said aromatic diols are of the formulas:

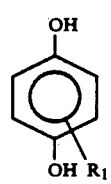

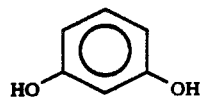

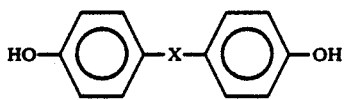

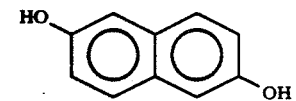

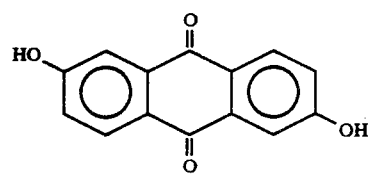

said aromatic dicarboxylic acids are of the formulas:

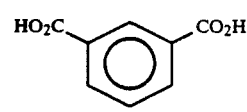

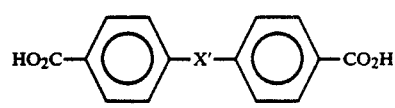

and said aromatic hydroxy acids or aromatic amino acids are of the formula:

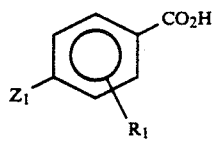

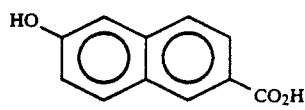

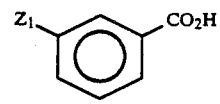

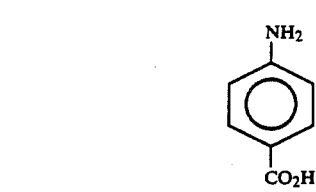

wherein:
$R_1$ is the same or different at each occurrence and is hydrogen, chloro or bromo;
—X— is —$CH_2$—, —$C(CH_3)_2$—, —O—, $SO_2$— or —S—;
$Z_1$ is —OH or —$NHR_3$ wherein $R_3$ is hydrogen or alkyl having from 1 to 6 carbon atoms; and
—X'— is —O— or —O—$CH_2$—O—.

21. The process according to claim 20 wherein said aromatic diols are of the formula:

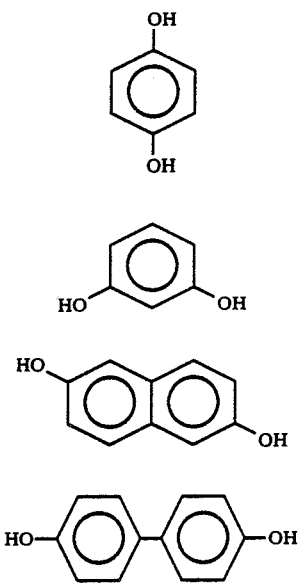

said aromatic dicarboxylic acids are of the formula:

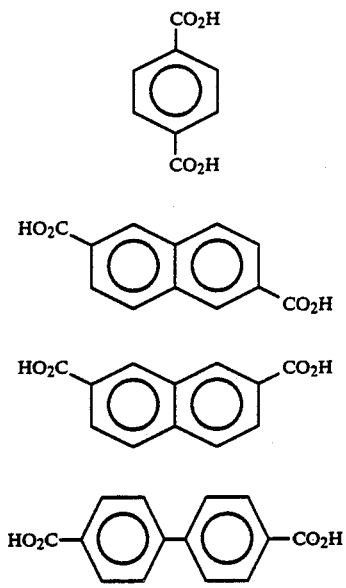

and said aromatic hydroxy acid or aromatic amino acids are of the formula:

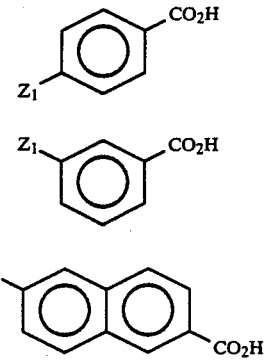

wherein $Z_1$ is —OH or —NH$_2$.

22. The process according to claim 1 wherein the average length of said filaments in the mixture is from about 0.05 to about 5 cm, the aspect ratio is equal to or greater than about 5, and the average diameter is from about 0.0005 cm to about 0.05 cm.

23. The process according to claim 22 wherein said average length is from about 0.05 cm to about 1.25 cm, said aspect ratio is from about 3 to about 3000, and said average diameter is from about 0.0005 cm to about 0.025 cm.

24. The process according to claim 23 wherein said average length is from about 0.05 cm to about 1.25 cm, said aspect ratio is from about 5 to about 2500, and said average diameter is from about 0.0005 to about 0.01 cm.

25. The process of claim 1 wherein the length distribution of said filaments is from about $X\pm0.5X$ to about $X\pm X$, and the diameter distribution of said filaments is from about $Y\pm0.5Y$ to about $Y\pm Y$.

26. The process of claim 25 wherein the length distribution of said filaments is from about $X\pm0.4X$ to about $X\pm X$, and the diameter distribution of said filaments is from about $Y\pm0.4Y$ to about $Y\pm Y$.

27. The process of claim 26 wherein the length distribution of said filaments is from about $X\pm0.3X$ to about $X\pm X$, and the diameter distribution of said filaments is from about $Y\pm0.3Y$ to about $Y\pm Y$.

28. The process of claim 27 wherein the length distribution of said filaments is from about $X\pm0.2X$ to about $X\pm X$, and the diameter distribution of said filaments is from about $Y\pm0.2Y$ to about $Y\pm Y$.

29. The process according to claim 1 wherein the molecular weight of polymer of said filaments is at least about 1000.

30. The process according to claim 29 wherein said molecular weight is from about 1000 to about 1,000,000.

31. The process according to claim 20 wherein said molecular weight is from about 2500 to about 75,000.

* * * * *